United States Patent [19]

Natsume et al.

[11] 4,255,466
[45] Mar. 10, 1981

[54] CARBON ELECTRODE AND MANUFACTURE THEREOF

[75] Inventors: Isamu Natsume, Komae; Yoshimichi Kobayashi, Tokyo; Toshinao Itou, Nirasaki, all of Japan

[73] Assignee: Mitsubishi Chemical Industries, Limited, Tokyo, Japan

[21] Appl. No.: 768,369

[22] Filed: Feb. 14, 1977

Related U.S. Application Data

[63] Continuation of Ser. No. 589,749, Jun. 24, 1975, abandoned.

[30] Foreign Application Priority Data

Jun. 24, 1974 [JP] Japan .................................. 49-71999

[51] Int. Cl.$^3$ .......................... B05D 3/02; C25B 11/12
[52] U.S. Cl. ..................................... 427/113; 204/294;
427/336; 427/377; 427/385.5; 427/443.2;
428/408; 428/423.1
[58] Field of Search ................... 427/113, 114, 385 R,
427/430 B, 377, 385.5, 443.2, 336; 428/367,
408, 425, 423.1; 204/294

[56] References Cited

U.S. PATENT DOCUMENTS

| 2,135,349 | 11/1938 | Meisse ................................ 427/377 X |
| 2,290,550 | 7/1942 | Gessler et al. ...................... 427/385 |
| 2,368,306 | 1/1945 | Kiefer et al. ......................... 427/113 |
| 2,433,212 | 12/1947 | Gleare .................................. 204/294 |
| 2,881,090 | 4/1959 | Recoll et al. ........................ 428/408 |
| 2,902,386 | 9/1959 | Hardman ............................. 204/294 |
| 2,909,450 | 10/1959 | Goldstein ............................. 427/244 |
| 3,375,132 | 3/1968 | Geise ................................ 427/113 X |
| 3,795,533 | 3/1974 | Gauri ............................... 428/425 X |
| 3,914,494 | 10/1975 | Park ................................ 428/408 X |

FOREIGN PATENT DOCUMENTS

45-25283 of 1970 Japan ....................................... 427/113

*Primary Examiner*—Evan K. Lawrence
*Attorney, Agent, or Firm*—Oblon, Fisher, Spivak, McClelland & Maier

[57] ABSTRACT

The pores of the carbon material of a carbon electrode are filled and coated with a hardened polyurethane resin wherein the outer surface of the electrode is uncoated.

8 Claims, No Drawings

CARBON ELECTRODE AND MANUFACTURE THEREOF

This is a continuation of application Ser. No. 589,749, filed June 24, 1975, abandoned.

BACKGROUND OF THE INVENTION

1. Field of the Invention

The present invention relates to a carbon electrode and a process for preparing it.

2. Description of the Prior Art

Carbonaceous materials such as graphite have pores with a porosity of less than 30% by volume, and are susceptible to air permeable osmosis. Accordingly, when carbon material is used as an electrolytic electrode, oxidation is caused not only on the surface of the carbon material but also in the pores resulting in local erosion. Consequently, excessive consumption of the carbonaceous material is caused by the breakdown of the structure of the carbon particles.

For example, it has been reported that the inner pores, having diameters of 2,500–70,000 A°, of a graphite anode used for the electrolysis of brine cause inner consumption of the electrode.

In past attempts to overcome this disadvantage the inner pores of electrolytic carbon electrodes have been filled and/or coated by impregnation-hardening methods using drying oils such as linseed oil and tung oil, chlorinated oils of said drying oils, chlorinated naphthalene, styrene-divinylbenzene type resins and the like and by impregnation-carbonizing methods using carbonized high molecular weight material such as pitch and the like.

However, since linseed oil is not easily hardened in the inner pores of a carbon electrode, a long hardening time is required. Also, chlorinated naphthalene is toxic. Moreover, most of the conventional thermosettable resins have inferior adhesiveness to the carbon material.

In the impregnation-carbonizing method using pitch, a large size apparatus is required and the effectiveness of the treatment is relatively low. In any case, it is difficult to coat the inner wall of the pores by the conventional methods, whereby excess consumption of the carbon electrodes by inner oxidation cannot be prevented. Consequently, it would be most desirable to have a technique for preventing the inner oxidation of carbon electrodes.

SUMMARY OF THE INVENTION

Accordingly, it is an object of the present invention to provide an electrolytic carbon electrode subject to substantially no excess consumption caused by inner oxidation.

It is another object of the present invention to provide an easily operable process for preparing superior electrolytic carbon electrode subject to substantially no excess consumption.

Briefly, these and other objects of this invention as will hereinafter by this ensuing discussion have been attained by providing a carbon electrode wherein the pores of the carbonaceous material are filled and coated with a hardened polyurethane resin except that the outer surface of the carbon electrode is uncoated.

The carbon electrode of the present invention is prepared by immersing a carbonaceous material for suitable use as an electrode into a solution of a thermosettable polyurethane, removing most of the solvent from the impregnated carbon material by volatilization, removing the thermosettable polyurethane from the outer surface of the carbon material and then heat-treating the product to harden the thermosettable polyurethane.

Flow-out of the thermosettable polyurethane is prevented by heat-treating the product under high pressure.

DESCRIPTION OF THE PREFERRED EMBODIMENTS

Suitable thermosettable polyurethane resins for use in the invention include those used as bases for paints.

Suitable such thermosettable polyurethanes include one-component type polyurethanes such as oil modified polyurethane resins prepared by reacting a modified polyol, e.g., caster oil, linseed oil, soya-bean oil or the like with a diisocyanate, and blocked polyurethane resins which comprise isocyanate blocked with a phenol, an oxime, a lactam, or the like (reclaimed isocyanates); and two-component type polyurethanes such as the catalyst hardened type polyurethanes and polyol hardened type polyurethanes.

It is preferred to use the one-component type polyurethanes, especially the blocked polyurethane resins because of their short hardening time. Suitable blocked polyurethane resins include mixtures of a polyol with a product produced by blocking an isocyante such as tolyenediisocyanate (TDI), diphenylmethanediisocyanate (MDI) or an isocyanato group of a prepolymer having an NCO terminal group with a blocking agent, and products produced by reacting a polyol with an isocyanate which is partially blocked by reacting an organic diisocyanate, e.g., TDI, MDI, and the like, with an equimolar amount of a monofunctional blocking agent.

Suitable polyols include polyethers such as polypropyleneglycol and polyethyleneglycol; polesters produced by reacting an organic acid, e.g., phthalic acid, adipic acid, maleic acid, and the like, with a glycol, e.g., ethyleneglycol, propyleneglycol, butyleneglycol, diethyleneglycol and the like or a polyol, e.g., trimethylolpropane, hexanetriol, glycerine, pentaerythritol and the like; and polyol resins produced by chain-extending a prepolymer having an NCO terminal group (prepared by reacting said polyol with said polyisocyanate) with a polyol such as trimethylolpropane, hexanetriol, triethanolamine, and the like.

Suitable blocking agents for isocyanato groups include phenols, e.g. phenol, cresol, p-tert-butylphenol, p-chlorophenol, p-nitrophenol and the like; oximes, e.g., methylethyl ketoxime, cyclohexanoneoxime, and the like, lactams, e.g. pyrrolidone, E-caprolactam and the like; and tert-alcohols, e.g., tert-butanol and the like.

In the invention, it is possible to use various types of polyurethanes and urethane prepolymers.

It is preferred to use block type polyurethanes which comprise blocked —NCO groups and —OH groups in the polymer chain, as stated above.

It is also possible to use urethanated oils which are prepared by reacting a dry oil with glycerine and further reacting a diisocyanate with the resulting diglyceride.

When these urethanated oils are used, the results are inferior to those obtained with the block type polyurethanes.

Additionally, it is possible to use two solution type polyurethanes. They are used by mixing a solution of a polymer having —NCO terminal groups with a solution of a polymer having —OH terminal groups at the time of application since the two solution type polyurethanes have a short pot life.

The block type urethane adducts having an —NCO terminal group can be combined with a polymer having an —OH terminal group to prepare the solutions of polyurethane or urethane prepolymer.

The carbon electrode of the invention can be prepared by the combination of an impregnation step, a solvent removing step the step of removing the thermosettable resin from the outer surface of the carbon material and a hardening step. The hardening step is conducted under a high pressure. The carbon material for the electrode (carbon electrode) is usually prepared mixing a coke with a pitch and heating the mixture to form graphite and, if preferred by crushing the product and mixing the powder with a pitch and heating the mixture to form shaped graphite having many pores. In the impregnation step, the carbon material is immersed into a solution of a thermosettable polyurethane resin under a normal pressure, a reduced pressure or a high pressure. Suitable solvents used for the solution include conventional ones such as ketones, e.g., acetone, methylethyl ketone, methylisobutyl ketone, and the like, and dimethyl formamide and the like. It is preferred to use ketones having a relatively low boiling point because of the resultant ease with which the inner wall of the pores of the carbon material can be watered with the resin and also because of the resultant ease of solvent removal. The concentration of the resin in this step is usually more than 5%, preferably more than 15%, and especially more than 25%. Typically the concentration of the thermosettable polyurethane resin in the polyurethane solution is in the range of from 15–65%. In the solvent removal step, most of the solvent is vaporized from the impregnated carbon material. It is preferred to control the pores so that rapid vaporization of the solvent is prevented and that instead vaporization of the solvent is gradual.

The solvent removal step is preferably conducted under reduced pressure and, if desirable, with heating. The temperature should be lower than the hardening temperature of the polyurethane employed. The removal coefficient of the solvent is usually higher than 50%, preferably higher than 65% and especially higher than 80%. When the removal coefficient of the solvent is higher than 90%, atmospheric pressure can be used as the initial pressure in the hardening step. In the step of removing the thermosettable resin from the outer surface of the carbonaceous material, the purpose is to remove both the resin coated on the outer surface of the carbonaceous material and the resin bleeded out onto the outer surface due to the varporizing of the solvent. When the resin is not satisfactorily removed, excess consumption of the carbonaceous electrode can easily occur at the beginning of use. The removal of the resin can be effected by washing with a solvent, or by abrasion or grinding of the outer surface of the carbonaceous material. It is preferred to employ the method of solvent washing. Suitable solvents for washing the outer surface include ketones, e.g., acetone, methylethyl ketone, methylisobutyl ketone and the like, dimethyl formamide and the like. It is preferred to use the same solvents used in preparing the impregnation solution from an operations viewpoint.

In the hardening step, the resin impregnated carbonaceous material is heat-treated. It is preferred to conduct the heat-treatment under high pressure in order to prevent the migration of the resin to the outer surface of the carbonaceous material by severe volume changes (expansion) of the solvent remaining in the pores of the carbonaceous material or of the volatile matter generated during the hardening of the resin. The pressure in the hardening step should be selected according to the kind of solvent used in the previous steps and the quality of the solvent removed. When the boiling point of the solvent is high and the removal coefficient of the solvent is high, the pressure can be relatively low. The pressure in the hardening step is usually in the range of 0.05–20 $kg/cm^2$ (gauge), preferably 0.1–10 $kg/cm^2$ (gauge). When the removal coefficient of the solvent is high, the initial pressure can be atmospheric and the resin-impregnated carbonaceous material can be heat-treated under the pressure caused by the heat-treatment itself.

The carbon electrode prepared in accordance with this invention has a long life time because the pores of the carbonaceous material are uniformily coated and filled with resin as compared to the conventional products. The operation of the process of the invention is simple and easy and the quality of the product is uniform, resulting in enormous industrial advantages.

Having generally described the invention, a more complete understanding can be obtained by reference to certain specific examples, which are included for purposes of illustration only and are not intended to be limiting unless otherwise specified.

PREPARATION OF THE POLYURETHANE RESIN SOLUTION

In a 1 liter four-necked flask equipped with a thermometer, a stirrer, a funnel and a condenser with a drying tube, 87 g (1 equivalent) of a mixture of 80% of 2,4-tolylenediisocyanate and 20% of 2,6-tolylenediisocyanate was charged and the mixture was stirred at 60° C. A solution 100 g (0.5 equivalent) of polypropyleneglycol having a molecular weight of 400 in 96 g of methylethyl ketone was added dropwise from the funnel to the mixture. After the addition, the reaction was conducted at 60° C. for 3 hours. The temperature of the reaction mixture was decreased to 40° C., and a solution of 74.5 g (1.5 equivalent) of triethanolamine in 96 g of methylethyl ketone was added to the reaction mixture. The reaction was further conducted at 50°–60° C. for 2 hours. The reaction product is referred to as (A). In another four-necked flask, 87 g (1 equivalent) of 100% of 2, 4-tolylenediisocyanate was charged and was stirred at 60° C. A solution of 47 g (0.5 equivalent) of phenol in 72 g of methylethyl ketone was added dropwise during two hours, and the reaction was further conducted for one hour. The reaction product is referred to as (B). The reaction product (B) was added dropwise to the reaction product (A) at 60° C., and the reaction was further conducted at 60° C. for three hours to obtain a thermosettable polyurethane resin. The polyurethane resin was dissolved in methylethyl ketone to prepare solutions having a concentration of 7.5%, 15%, or 30%.

EXAMPLE 1

A porous graphite plate (10×10×30 mm, 5.2 g) was immersed into the solution of the polyurethane resin (concentration of 30%) and the plate was heated to 50° C. under atmospheric pressure. The solvent was then gradually vaporized at 50° C. under a reduced pressure. The resin bleeded out onto the outer surface of the sample was washed with methylethyl ketone. The treated sample was put in an autoclave and 2 kg/cm² (gauge) of initial pressure was applied to the autoclave. The autoclave was then heated to 120° C. under a pressure of 4 kg/cm² (gauge) for 1 hour to harden the resin. The graphite sample treated with the resin was obtained. An electrolysis was conducted by using an anode made of the resulting graphite sample, a cathode made of an untreated graphite plate (100×150×5 mm) and an electrolyte of 5 g/l HCl at 50° C. in a current density of 9 A/dm² at an electrode distance of 30 mm. (The total electrolysis time was 21 hours and the concentration of the electrolyte was adjusted after each 3 hours). As a result, the consumption of the anode was 51.8 mg/AH. When an untreated graphite plate was used as an anode, the consumption of the anode was 89.4 mg/H. The rate of the consumption was 58 which is the ratio of the consumption of the anode made of the treated graphite plate (mg/AH) X 100, to that of the anode made of the untreated graphite plate (mg/AH).

EXAMPLES 2-4

Graphite plates as in Example 1 were immersed into solutions of the thermosettable polyurethane resin having concentrations of 7.5, 15 or 30%. The samples were removed and kept at room temperature under atmospheric pressure for one day and night. They were further maintained at 80° C. under a reduced pressure for 1 hour in order to remove the solvent. The outer surface of the treated graphite plate was washed with acetone and the products were kept at 120° C. for 1 hour in an oven in order to harden the resin whereby treated graphite samples were obtained. The electrolysis of Example 1 was repeated by using these treated samples as anodes. The consumption rates of the treated samples were, 80,75 and 68 for resin concentrations of 7.5%, 15% and 30%, respectively.

EXAMPLE 5

In accordance with the process of Example 1, a graphite plate was immersed into the solution of polyurethane resin (concentration of 30%). The solvent was removed under a reduced pressure as set forth in Examples 2-4. The surface of the treated graphite plate was washed with dimethyl formamide at 120° C. Simultaneously the hardening of the polyurethane resin was attained. The treated graphite plate was used as the anode for an electrolysis in accordance with the process of Example 1. The consumption rate of the electrode was 58.5.

EXAMPLE 6

In accordance with the process of Example 1, a graphite plate was immersed in the solution of the polyurethane, the solvent was removed and the surface was washed. The product was put into an autoclave and the autoclave was heated initially at atmospheric pressure and was kept at 120° C. under 2 kg/cm² (gauge) (an increase of pressure due to the heating) for 1 hour whereby the polyurethane resin was hardened to obtain the treated graphite plate. The treated graphite plate was used as the anode for an electrolysis in accordance with the process of Example 1. The consumption rate of the electrode was 59.

REFERENCE EXAMPLE 1

A graphite plate as in Example 1 was immersed into a solution of linseed oil in trichloroethylene (concentration of 30%) and the solution was removed. The surface was then washed with steam, and the linseed oil was hardened by heating in air. The treated graphite plate was used as the anode for an electrolysis in accordance with the process of Example 1. The consumption rate of the electrode was 76.

REFERENCE EXAMPLE 2

In accordance with the process of Example 5 except for use of a solution of styrene-divinylbenzene copolymer in methylethyl ketone (concentration of 30%), a graphite plate was treated. The treated graphite plate was used as the anode for an electrolysis in accordance with the process of Example 1. The consumption rate of the electrode was 97.5.

REFERENCE EXAMPLE 3

In accordance with the process of Example 1, a graphite plate was immersed into a solution of polyurethane resin (concentration of 30%) and was removed. It was kept at room temperature under atmospheric pressure for 1 day and night. The product was heated at 120° C. for 1 hour in an oven to harden the polyurethane resin. The treated graphite plate was used as the anode for an electrolysis in accordance with the process of Example 1. The consumption rate of the electrode was 82.6.

EXAMPLE 7

In a flask, 100 g of trimethylol propane-tolylenediisocyanate-phenol adduct (NCO content of 12.5%), 31 g of polyesterpolyol (Desmophen 1100 manufactured by Bayer A. G.) and 30 g of polyester polyol (Desmophen 800 manufactured by Bayer A. G.) were mixed. Methylethyl ketone was then added to the mixture to form a solution containing 30% of a urethane-prepolymer. In accordance with the process of Example 1, a graphite plate was immersed into said solution and a treated graphite plate was prepared. The treated graphite plate was used as the anode for an electrolysis in accordance with the process of Example 1. The consumption rate of the electrode was 60.

EXAMPLE 8

In a flask, 100 g of a solution of 75% trimethylol propane-tridiisocyanate adduct (NCO content of 13.0%) in methylethyl ketone 31 g of polyesterpolyol (Desmophen 1100 manufactured by Bayer A. G.) and 31 g of polyesterpolyol (Desmophen 800 manufactured by Bayer A. G.) were mixed. The mixture was diluted with methylethyl ketone to form a solution of 30% of urethane prepolymer. A graphite plate as in Example 1 was immersed into said solution and the treated plate was washed with methylethyl ketone and was kept at 30° C. for 3 hours. The product was then heated at 80° C. for 2 hours under atmospheric pressure to harden the polyurethane resin. The treated graphite plate was used as the anode for an electrolysis in accordance with the process of Example 1. The consumption rate of the electrode was 57.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A carbon electrode wherein the pores of the carbonaceous material are filled and coated with a hardened polyurethane resin and wherein the outer surface of the carbon material of the electrode is uncoated.

2. A process for preparing a carbon electrode which comprises: immersing a porous carbonaceous material suitable for use as an electrode, into a solution of a thermosettable polyurethane; removing the material from the solution; removing most of the solvent from the impregnated porous carbonaceous material by volatilization; removing the thermosettable polyurethane from the outer surface of the porous carbonaceous material;
   and then heat-treating the product to harden the thermosettable polyurethane.

3. The process of claim 2, wherein bleeding-out of the thermosettable polyurethane is prevented by heat-treating the product under high pressure.

4. The process of claim 2, wherein the thermosettable polyurethane resin impregnated in the pores of the carbonaceous material is hardened at a temperature of 50°–200° C. under a gauge pressure of 0.05–20 kg/cm$^2$.

5. The process of claim 2, wherein the concentration of the thermosettable polyurethane resin in the polyurethane solution is in the range of 15–65%.

6. The process of claim 2, wherein the impregnated carbonaceous material is washed with a solvent for the thermosettable polyurethane resin so as to expose the outer surface of the carbonaceous material.

7. The process of claim 2, wherein the polyurethane resin is a mixture of a polyol with the product produced by blocking an isocyanate with a blocking agent.

8. The process of claim 2, wherein the thermosettable polyurethane resin impregnated in the pores of the carbonaceous material is hardened at 50°–200° C. under the gauge pressure of 0.5–20 kg/cm$^2$.

* * * * *